United States Patent [19]

Kronfeld et al.

[11] 4,309,732

[45] Jan. 5, 1982

[54] TRANSDUCER SUPPORTING ASSEMBLY FOR DOUBLE SIDED FLOPPY DISK

[75] Inventors: Leonard E. Kronfeld, Minneapolis; Ricky J. Madsen, Crystal, both of Minn.

[73] Assignee: Nortronics Company, Inc., Minneapolis, Minn.

[21] Appl. No.: 82,237

[22] Filed: Oct. 5, 1979

[51] Int. Cl.³ .................. G11B 5/54; G11B 5/48; G11B 21/16; G11B 5/22

[52] U.S. Cl. .................. 360/104; 360/105; 360/122; 360/130.2

[58] Field of Search ............. 360/104, 105, 106, 97–99

[56] References Cited

U.S. PATENT DOCUMENTS

| Re. 29,380 | 8/1977 | Castrodale et al. | |
|---|---|---|---|
| 3,678,481 | 7/1972 | Dalziel et al. | |
| 3,815,150 | 6/1974 | Stoddard et al. | |
| 3,946,439 | 3/1976 | Castrodale et al. | |
| 3,975,770 | 8/1976 | Spash et al. | |
| 3,975,774 | 8/1976 | Helbers . | |
| 3,990,111 | 11/1976 | Elliott . | |
| 4,005,493 | 1/1977 | Morgan . | |
| 4,012,791 | 3/1977 | Bleiman . | |
| 4,024,581 | 5/1977 | Lesca et al. | |
| 4,038,693 | 7/1977 | Huffine et al. | |
| 4,040,106 | 8/1977 | Medley . | |
| 4,074,331 | 2/1978 | O'Reilly et al. | |
| 4,085,428 | 4/1978 | Green et al. . | |
| 4,089,029 | 5/1978 | Castrodale et al. | |
| 4,133,015 | 1/1979 | Butsch . | |
| 4,139,877 | 2/1979 | Townsend . | |
| 4,151,573 | 4/1979 | Tandon et al. | 360/104 |
| 4,189,759 | 2/1980 | Bauck et al. | 360/104 |
| 4,209,813 | 6/1980 | Bryer | 360/105 |
| 4,247,877 | 1/1981 | Keller et al. | 360/105 |
| 4,250,530 | 2/1981 | Yang | 360/105 |

OTHER PUBLICATIONS

IBM Tech. Disc. Bull., vol. 20, No. 6, Nov. 1977, p. 2374.
IBM Tech. Disc. Bull., vol. 21, No. 2, Jul. 1978, p. 770.
IBM Tech. Disc. Bull., vol. 20, No. 11A, Apr. 1978, pp. 4535, 4538.
IBM Tech. Disc. Bull. vol. 18, No. 9, Feb. 1976, p. 3018.
IBM Tech. Disc. Bull, vol. 18, No. 12, May 1976, p. 4112.
IBM Tech. Disc. Bull., vol. 19, No. 9, Feb. 1977, p. 3546.

*Primary Examiner*—Robert S. Tupper
*Attorney, Agent, or Firm*—Merchant, Gould, Smith, Edell, Welter & Schmidt

[57] ABSTRACT

An electromagnetic transducer assembly includes a carriage 30 carrying a first transducer 33 projecting therefrom and a load arm 35 carrying a second transducer 32 arranged for gimballing movement about a pair of mutually perpendicular axes, the arm being connected to the carriage by a leaf hinge assembly 43 for movement to load or unload transducer 32 to the disk recording medium 20. The transducers have planar disk engaging faces surrounded by edge bevels which merge smoothly with each other at conical corner surfaces 144, 157, and which are blended smoothly into the faces. The second transducer 32 is mounted in the arm on a flexure member 65, which also mounts a connector block 75 to which a flex strip 81 is connected, and which includes eyelet pins for facilitating the wiring of the transducer coils. The arm has an aperture 60 near the end which includes transducer 32 which permits access thereto during assembly. Insert cover 120 fits the aperture and includes a lifting tab 122, and an adjustable pivot member 133 for the gimballing of the transducer. The base includes ramps 160, 161 for facilitating the insertion and removal of a diskette 21 into operative position with respect to the transducers. The hinge assembly includes a leaf spring 44 and means 45–47, 52, 53 clamping it to the arm and to the base. A spring 55 urges the arm in a first direction about the hinge, and acts as a cover for passages 83–86 leading a connection cable 80 to the flex strip.

3 Claims, 13 Drawing Figures

TRANSDUCER SUPPORTING ASSEMBLY FOR DOUBLE SIDED FLOPPY DISK

TECHNICAL FIELD OF THE INVENTION

This invention relates generally to magnetic recording apparatus, and more specifically to improvements in support structures for electromagnetic transducers of the type particularly usable with a magnetic disk data storage system, for transferring data between the transducer and a flexible magnetic disk.

BACKGROUND OF THE PRIOR ART

Requisite to all magnetic data storage systems are a magnetic data recording media for storing data in magnetic form and an electromagnetic transducer having one or more "heads" for performing "reading" and/or "writing" of data in magnetic form, respectively from or onto the recording media. While such magnetic data storage systems have utilized data recording media of various configurations (such as tapes, rigid disks and drums), the so-called "floppy disk" media has recently found wide applicability not only in program storage and entry applications, but also in a number of diverse data entry, storage and control applications. The "floppy disk" media is a thin, generally planar flexible or pliant magnetic disk having magnetically sensitive surfaces and currently rotatable at speeds of approximately 360 rpm, within a protective envelope or jacket cover. Data transfer to and from the floppy disk is achieved by one or more electromagnetic heads arranged within, and collectively forming a transducer. The transducer (or transducers) communicate with one or both surfaces of the floppy disk through window openings in the protective envelope.

A number of various transducer structures useful for communicating with floppy disks have appeared in the prior art. In general, those portions of such transducers that are responsible for the electromagnetic transfer to and from the floppy disk, have not significantly differed from one another in their basic component pieces. Each such transducer basically comprises a plurality of magnetic core members prepositioned with respect to one another, secured together and interconnected with one or more coils, to define an operable electromagnetic transducer. For the most part, such transducer structures, as used in association with data transfer to and from a floppy disk, have comprised a single channel read/write head, and may typically also include an eraser head. The eraser head generally comprises a plurality of erase cores for trimming a "track" of information written onto the floppy disk surface, and for erasing a pair of guard-band areas on each side of the trimmed track. For the purpose of this invention, the particular structural details and relative placement of the electromagnetic components which collectively comprise the various head portions of an electromagnetic transducer are not important per se, since this invention applies equally well to any electromagnetically operative "type" of such transducer and component head structures thereof, whether they are multiple or single, erase, read, write, or combination read/write heads.

In the initially introduced single-sided systems, electromagnetic data transfer between the transducer and floppy disk is possible only to one side of the floppy disk at a time. Efficiency is significantly improved with a double sided system. In such a system, data transfer to both sides of the floppy disk is possible at the same time. This is made possible through the use of a pair of generally opposed transducers, operatively disposed to sandwich the floppy disk therebetween, thus simultaneously engaging both surfaces of the floppy disk.

Floppy disk systems of the prior art, both single and double sided, have typically mounted their respective transducer "assemblies" upon a movable carriage structure which is radially indexed with respect to a relatively fixed position floppy disk. Movement of the carriage structure enables the transducer or transducers carried thereby to access different desired circular "tracks" located at different radial positions on the magnetizable surface of the floppy disk. Positioning of the movable carriage structure must be aligned and controlled with respect to the nominal disk plane, which is defined as that plane in which a surface of a floppy disk nominally lies during operative rotation of the disk. Since a floppy disk has two data transfer surfaces that are separated by the thickness of the floppy disk, a double sided system will be concerned with two nominal disk planes, generally referred to as "upper" and "lower" nominal disk planes. In an optimally operative system, except for that portion of the floppy disk that is engaged by the transducers, it is desirable for the two data transfer surfaces of the floppy disk to lie perfectly planar respectively in the upper and lower nominal disk planes, with no imperfections therein, such as wobble, or deformation caused for example by imperfections in the disk itself, by the flexible nature of the disk or by motion transmitted to the disk by the apparatus rotating the disk.

Prior art floppy disk data transferring systems have differed in their designs of the transducer support structures that are mounted to the movable carriage. In early single sided floppy disk systems, the transducer generally had a curved surface for operably engaging the floppy disk and for penetrating into and beyond the nominal disk plane of the engaged data transfer surface. The transducer was generally fixedly mounted to the movable carriage. A hinge arm carrying a pressure pad was pivotally mounted to the carriage to allow for disk entry. The arm was spring loaded, such that the pressure pad carried thereby engaged the disk at a location directly opposite the transducer head, and applied a known force to the disk, conforming the pliant disk into intimate engagement with the curved transducer head. This early single sided system offered limited capacity in data transfer since data transfer to only one side of the disk at a time could be achieved, and was thus relatively slow.

Larger capacity and faster data access and transfer requirements have resulted in double sided data transfer floppy disk systems, having the capability of simultaneously transferring data with both sides of a floppy disk. As above stated, such systems generally have a pair of transducers mounted to operatively engage opposite surfaces or sides of the floppy disk, in generally opposed relationship to one another. The opposed transducers are generally positioned such that their respective head "gaps" are slightly radially offset relative to one another, for minimizing magnetic flux interaction between the transducers.

In such prior art double sided floppy disk data transfer systems, the upper and lower recording surface areas of the floppy disk may periodically move out of their respective upper and lower nominal disk planes.

Such deviations could, for example, be caused by distorted disks or excessive disk wobble (i.e., perturbations in the disk surfaces as the disk rotates). It has therefore been thought to be desirable for the oppositely disposed transducer heads to be movably mounted in opposition to one another, so that the transducer heads could follow the actual path of the floppy disk recording surfaces passing therebetween, as they deviated from the upper and lower nominal disk planes. Accordingly, various transducer mounting arrangements have been devised in the prior art, to accommodate such deviations in floppy disk operative movement.

One such mounting configuration, described in U.S. Pat. No. Re. 29,380, reissued Aug. 30, 1977, illustrates a method of mounting a pair of transducer slider heads in opposing relationship upon a pair of fixed support arms, movable under solenoid action, toward and into engagement with the disk in a "loading" operation, and away from and out of engagement with the disk during a "unloading" operation. The support arms engage stop members on a carriage to limit the closure distance therebetween to a fixed predetermined amount. The opposing transducer heads are urged into forceable engagement with the disk by a pair of coil springs underlying the transducer heads, to sandwich the floppy disk therebetween.

As pointed out more fully in copending application entitled "Z-Axis Flexure Suspension Apparatus" by Leonard Kronfeld, Ser. No. 082,009, filed Oct. 5, 1979, and assigned to the same assignee as the present application, such a structure is subject to certain disadvantages in terms of lack of sensitivity of movement to follow deviations of the floppy disk, introduction of data transfer errors caused by shifting of the transducers relative to the recording tracks, slow damping response following a loading operation, and reduced intimacy of contact between the transducer heads and the recording surfaces of the floppy disk.

Another variation of a dual transducer mounting configuration is described in U.S. Pat. No. 4,089,029 issued May 9, 1978. In that structure, a pair of transducers mounted on long cantilevered support arms are mechanically urged together under spring bias, with each of the oppositely disposed transducers carried thereby being independently mounted on a gimbal structure which allows universal pivotal motion of the respective transducer head assemblies. The disk engaging surfaces of the transducer heads are generally planar. The pivoted transducer support arms are interlocked such that motion of one such arm tending to raise one of the transducers from engagement with the surface of the disk also moves the second arm so as to move the second transducer from the opposing surface of the disk, for loading and unloading the disk into and out of operative position. Each arm is urged with a predetermined force against its corresponding side of the disk, tending to maintain intimate contact between the transducer carried by that arm and its respectively engaged disk surface. The composite structure sandwiches the floppy disk between the opposed transducers at a relatively weak loading force of six to seven grams, which tends to give rise to instability. Also, while the double-gimballed structure is configured to enable rapid responsive movement of the transducer heads to accomodate perturbations in disk movement out of the Nominal Disk Planes, such transducer tracking movements give rise to shifting or offset errors, as pointed out in greater detail in the above-identified copending application. The system is very complicated and expensive to construct and manufacture.

A relatively recent configuration of a double sided floppy disk data transfer system is disclosed in U.S. Pat. No. 4,151,573 issued Apr. 24, 1979. This structure is configured to improve the intimacy of contact between the transducer disk surfaces and to reduce some of the disadvantages of the prior double-gimbal transducer support structure. This structure uses an asymmetrical transducer support structure having a first or lower transducer with a planar transducer core surface that is immovably fixed (as in early single-sided transfer systems). A second (upper) transducer is mounted on a universally movable gimbal structure and is pivotally movable by a spring loaded arm into operative proximity with the fixed lower transducer head so as to sandwich the floppy disk therebetween at a predetermined force. The lower transducer head structure is sized (in surface area) relatively larger than the upper transducer head, so as to extend considerably beyond the outline dimensions of the upper core transducer. The core surface of the lower transducer is mounted so as to penetrate excessively into the nominal disk plane of a loaded floppy disk, and the upper transducer carried by the gimballed support structure acts as a pressure pad for the lower fixed transducer head. Conversely, the lower fixed transducer head acts as a pressure pad for the upper transducer core. While reducing some of the shifting and offset tracking errors inherent in the double gimbal structures described above, this structure still experiences some mispositioning of the transducer relative to the recording tracks of the lower surface of the floppy disk, due to the fixed nature of the lower transducer head. The structure according to that patent also has the disadvantage of excessive wear on the floppy disk due to the "hard" landing of the upper transducer during loading of the system. These particular shortcomings of the prior art are overcome by the improvement disclosed and claimed in the above-identified copending application.

In order to solve these and other problems of the prior art, an improved transducer assembly as disclosed herein has been developed, including an improved transducer support arm and leaf hinge for connection to a carriage.

SUMMARY OF THE INVENTION

According to the present invention there is provided an improved transducer support arm and leaf hinge, for use in connecting to a movable transducer support carriage in a double sided floppy disk magnetic transducer assembly. The improvement includes an elongate support arm having a generally flat lower service, and means for mounting a magnetic transducer adjacent one end of the arm and projecting below the lower surface of the arm for contact with the recording medium when the arm is assembled as a part of a complete system and is in operative position. The support arm has a cut away or recessed portion in the flat lower surface adjacent the end of the arm remote from the transducer. A leaf hinge, and a pair of clamping plates are provided. The clamping plates are connected to one end of the leaf hinge, preferably by spot welding, and the sandwich structure is connected to the arm with one of the clamping plates fitting into the recess portion of the lower side of the arm. The clamping plates have opposed straight edges contacting the leaf hinge, and cooperating to define a bending axis or fulcrum for the leaf hinge.

Preferably, the outer surface of the lower clamping plate is generally coplanar or even with the generally flat lower surface of the arm.

DESCRIPTION OF THE PREFERRED EMBODIMENT

Figure 1:
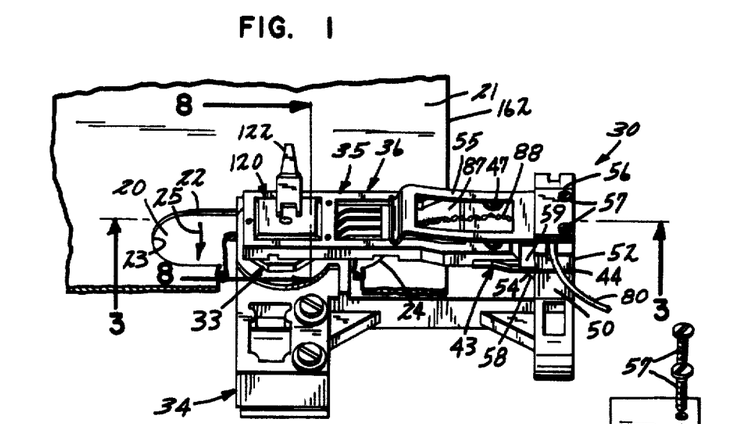
FIG. 1 is a perspective view of a magnetic transducer assembly according to the present invention, parts thereof being broken away for clarity.

In FIG. 1, a portion of a "diskette" or "floppy disk" is shown inserted into a data transfer position with respect to a transducer assembly according to the present invention. Because of space limitations in FIG. 1, most of the floppy disk is broken away. The floppy disk comprises a thin nominally planar disk 20 of flexible material, the surfaces of which are coated with a magnetizable material. Disk 20 is enclosed in a protective envelope 21. Envelope 21 has upper and lower aligned radially extending slots 22, which, as seen also in FIG. 9, extend between inner ends 23 and outer ends 24 to define transducer access areas for the surfaces of the disk. Conventional disk drive means (not shown) are provided to cause rotation of disk 20 within envelope 21 as suggested by arrow 25 in FIG. 1. Envelope 21 of course does not rotate, as it is held in place by suitable guide means (not shown) as is generally known.

A carriage indicated by the general reference number 30 is provided for the support and movement of the transducers as explained in greater detail below. Carriage 30 connects in practice to a lead screw or other positioning means as is generally known in the prior art to move the carriage radially as desired to bring the transducers into engagement with the desired ones of the plurality of circular tracks recorded on the disk 20 at different radial spacings. As seen more clearly in FIGS. 4 and 9, a pair of transducers 32 and 33 are supported and carried by carriage 30 for engagement with the recording medium. For convenience throughout this patent specification, transducer 32 will be referred to as the "upper transducer" or "head" and transducer 33 will be referred to as the "lower transducer" or "head". However, the terms "upper" and "lower" are used merely for convenience of identification, and do not imply a required relationship, since the head assembly could also be incorporated in a diskette recording system with orientation on edge, or "upside down" from the orientation shown in the figures, or with any other desired orientation.

Upper transducer 32 is connected to carriage 30 by means of the support arm structure which is described in more detail below in this specification. The upper transducer and arm assembly can operate either in conjunction with an immovably fixed lower transducer of the type disclosed in U.S. Pat. No. 4,151,573, discussed above; or preferably, with a transducer having a Z-axis flexure suspension as set forth in the above-identified copending application.

With either a fixed or a Z-axis suspension lower transducer, the function of the upper transducer arm assembly is to maintain the transducer in properly aligned opposing engagement of the floppy disk 20, with the faces of the transducers parallel and in intimate contact with the recording surfaces of the disk for optimum data transfer. As pointed out in the above-mentioned copending application, this task can be best achieved with the Z-axis suspension for the lower transducer 33; but in either case, the improved upper transducer arm assembly described herein will aid in efficient and reliable data transfer.

Figure 2:
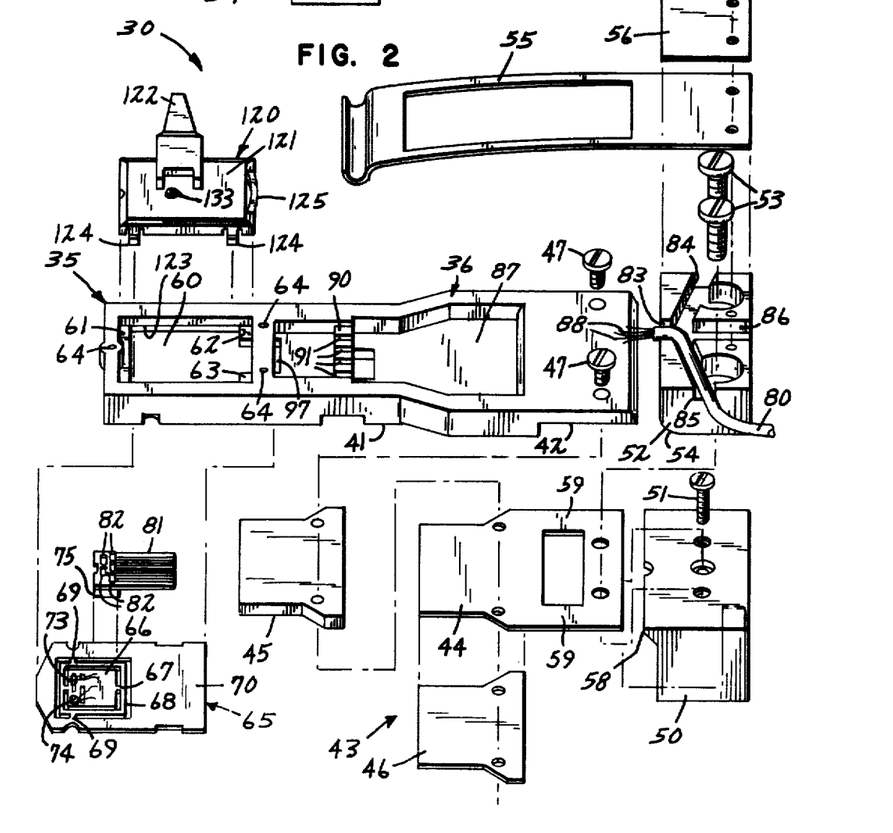
FIG. 2 is an exploded view of a portion of FIG. 1 to a larger scale.

As seen in the figures, with particular reference to FIG. 2, arm 35 comprises a body portion 36 which is preferably molded of plastic or other lightweight electrically nonconductive material, although it is not essential that it be non-conductive. Body 36 has a generally flat bottom surface 41, one end of which is cut away at reference number 42 to receive a leaf hinge assembly 43. The leaf hinge assembly includes a leaf spring 44, which is preferably made of a suitably resilient metal, having one end generally adapted to fit within the cut away portion 42 of the body 36, and an opposite end configured for securing to a pedestal 50, or other clamping means. The overall width of leaf hinge 44 is selected in conjunction with the width of body 36 and pedestal 50 to provide the desired degree of torsional rigidity. Leaf hinge 44 is preferably cut away in the central, or flexing portion so as to minimize its stiffness or resistance to bending, as the leaf hinge is used only for hinging purposes and not as a spring tensioning member, since a separate spring 55 is provided for that purpose. The left end of leaf hinge 44 in FIG. 2 is spot welded between upper and lower backing plates 45 and 46, and this sandwiched structure is secured within cut away portion 42 of body 36 by fasteners 47.

It has been the practice in the prior art to inbed the end of the leaf hinge into the body of the transducer arm during the molding process. However, the improved structure described above with reference to FIG. 2 offers several important advantages. For one thing, the straight edges of backing plates 45 and 46 form a definite straight clamping edge defining the beginning of the bendable or flexing portion of the leaf hinge. Another advantage is that different shapes and sizes of leaf hinges can be made and secured to a single type of body 36, so that a single transducer arm assembly can be adapted to different leaf hinges for connection to different types of carriages made by different manufacturers, thus providing a manufacturing and cost improvement.

In the preferred embodiment, a pedestal 50 and a clamping piece 52 are provided for securing the outer end of the leaf hinge. Pedestal 50 is secured to the carriage by a suitable fastener such as screw 51. Alternately, pedestal 50 may be made integrally with the carriage. Pedestal 50 has a generally flat upper surface parallel to the face of the lower transducer terminating in a straight edge 58 which defines the other fulcrum or bending axis for leaf hinge 44, for the arm moving in a downward direction. The outer end of leaf hinge 44 is placed on top of pedestal 50, and is held in place by clamping piece 52 and suitable fasteners 53 which pass through the clamping piece and leaf hinge into the pedestal. The inward edge of clamping piece 52 is radiused as shown at reference number 54 to distribute the stress in the leaf hinge 44 as it flexes upward as during an unloading operation.

Arm 35 is urged downwardly, towards the floppy disk, by a spring 55 bearing against the upper surface of the arm and secured to the top of clamping piece 52 by a backing plate 56 and fasteners 57. The top surface of pedestal 50 is parallel to the plane of the face of the lower transducer. The height of pedestal 50 is selected as required so that the face of the upper transducer, at a time just prior to contact with the disk surface in a loading operation, will be parallel to the plane of the face of the lower transducer.

The end of body 36 remote from hinge assembly 43 is formed with a generally rectangular opening 60 having a ledge 61 near its bottom at one end and a pair of spaced ledges 62, 63 at its other end: the ledges are all of the same height from surface 41.

A flexure member 65 is secured to the lower side of the outer end of body 36 by spot welding to fasteners 64 which pass through the arm in the locations indicated in FIG. 2. The flexure is shown in greater detail in FIG. 5. The flexure is made from a thin piece of non-magnetic, resilient material: in the preferred embodiment, stainless steel is used. Various portions or zones have been etched away to form a two axis gimbal. A central rectangular portion 66 connects continuously through symmetrically opposite narrow connecting strips 67 to a rectangular annulus 68. The latter portion in turn is connected at opposite connecting strips 69 to the outer portion 70 of the flexure piece. It will be understood that the above-mentioned central portion, annulus and connecting strips are all continuously and integrally part of the same original strip from which the other areas have been etched away to form the structure described.

Transducer 32 is secured to a part of the central portion 66 as is described below, and the flexure provides a definite two axis or X-Y gimbal for the transducer. Specifically, the Y axis passes through, and is defined by, strips 67, and the X axis similarly passes through strips 69.

Figures 3, 5, 6:
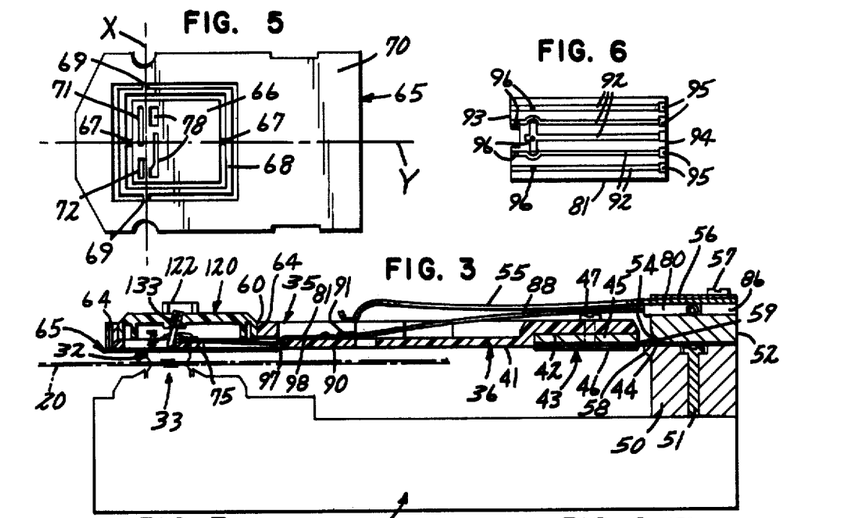
FIG. 3 is a sectional view along the line 3—3 of FIG. 1.
FIG. 5 is a view of a flexure used in the transducer assembly of FIG. 1.
FIG. 6 is a view of a flex cable used in the assembly.
Figures 4, 7, 8:
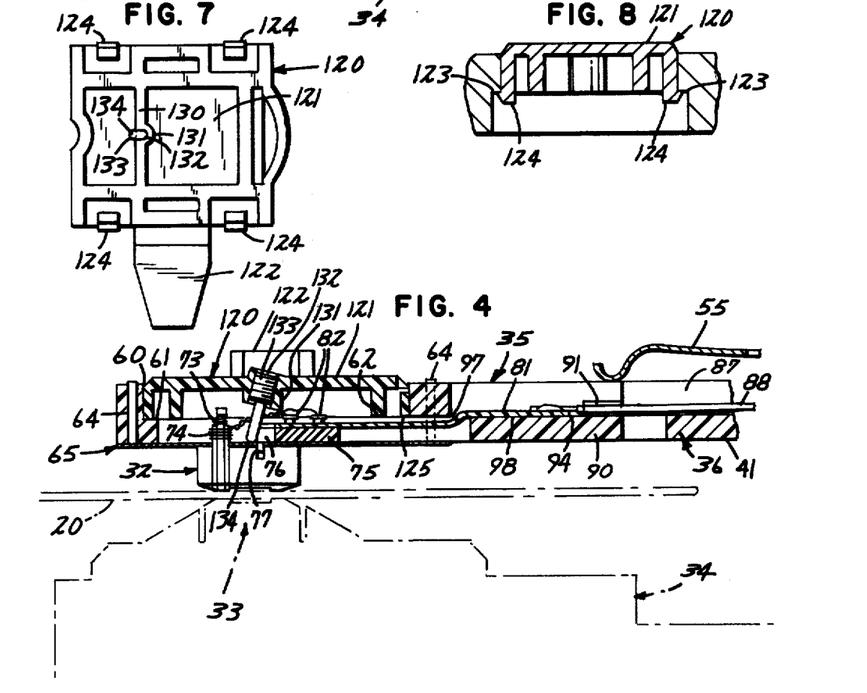
FIG. 4 is a fragmentary view similar to FIG. 3 but to a larger scale.
FIG. 7 is a bottom view of a snap-in insert used in the assembly.
FIG. 8 is a fragmentary sectional view along the line 8—8 of FIG. 1.

Transducer 32 consists of a sandwich of core pieces and ceramic spacer pieces generally of the type shown in my prior U.S. Pat. No. 4,152,742. It comprises a generally rectangular body with the core pieces forming read/write and erase gaps on the face of the transducer, and with the rearward legs of the pole pieces extending away from the transducer body for attachment of magnetic coils, wires, and a back bar. Transducer 32 is adhesively secured to the central portion 66 of the flexure, with the transducer body centered on the intersection of the X and Y axes with the transducer oriented with its read/write gap in the proper direction for data transfer. Apertures 71 and 72 in central portion 66 provide clearance for the rear legs of the core pieces of the transducer assembly. Referring to FIGS. 3 and 4, coils 73, 74 of the transducer are placed on the legs which pass through the apertures and above flexure member 65. The back bar may then be put in place.

With transducer 32 thus mounted to arm 35 as described above, flexure 65 provides a torsionally resilient mounting for allowing rotation of the transducer about X and Y axes, while not interfering magnetically with the transducer operation.

Figure 9:
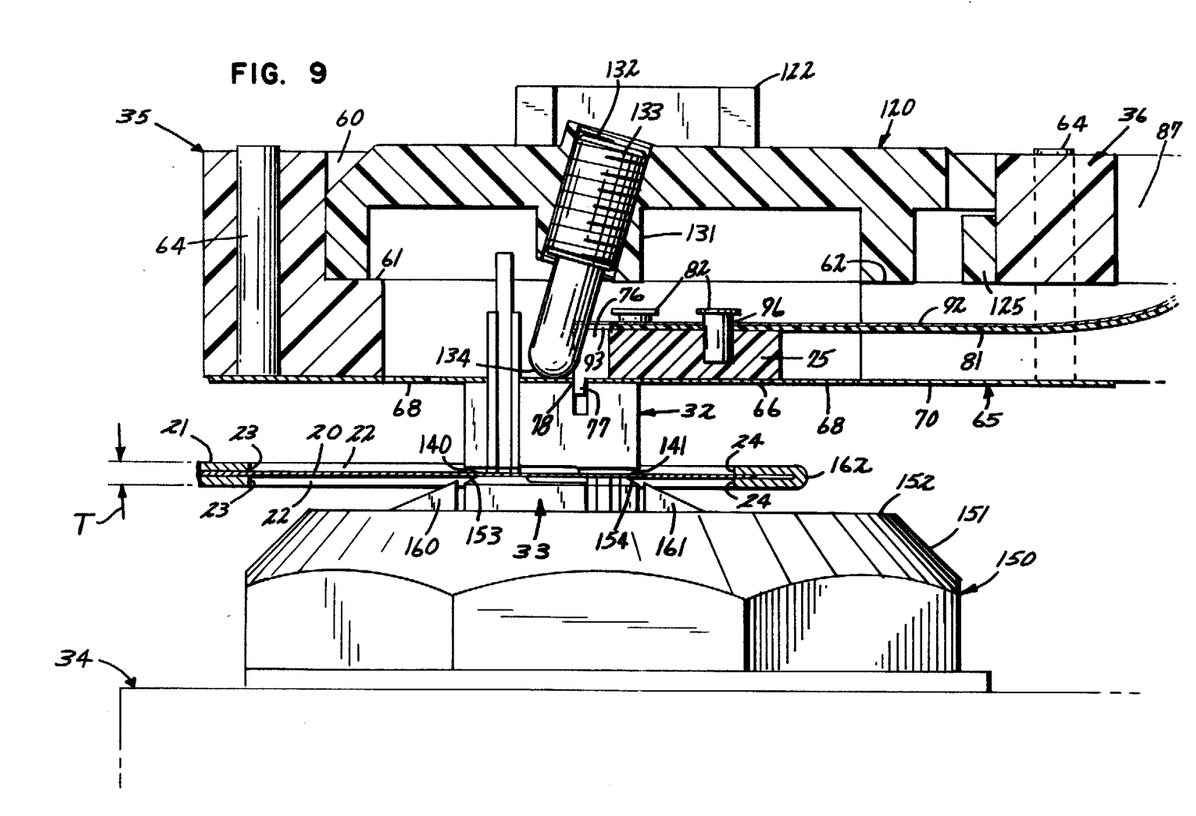
FIG. 9 is a fragmentary view generally like FIG. 4 but to a still larger scale, parts being omitted or shown in section.

Electrical connections between transducer 32 and the system with which it will be used are made with the help of a connector board 75 having eyelets 82, a flex strip 81 and a cable having a plurality of wires. Phenolic connector board 75 is generally rectangular in shape and sized to fit alongside transducer 32 on central portion 66 of flexure 65. A central notch 76 is provided along one side of connector board 75 as shown in FIG. 2. The same edge of connector board 75 has an interrupted downwardly extending lip 77, as seen in FIG. 9, which passes through apertures 78 in flexure member 65 and into a notch 79 provided in the back side of the body of transducer 32. Connector board 75 is adhesively secured to the central portion 66 of flexure 65.

Flex strip 81 is an extremely compliant printed circuit having a plurality of flat conductors 92 extending between a first end 93 configured to conform to the size of connector board 75, and a second end 94 at which the conductors are enlarged to provide pads or terminals 95 to which wires 88 are to be soldered. At the end 93 of the flex strip, the conductors are provided with holes 96. End 93 is placed on connector board 75 and terminal eyelets 82 are passed through holes 96 and into, but not through, connector board 75. The end 94 of flex cable 81 passes upwardly through a slot 97 in body 36 which opens into recess 87 formed therein. A low transverse partition 90 within recess 87 has small longitudinal slots 91 to frictionally engage and retain the individual wires 88 of a cable 80. Terminals 95 are soldered to the ends of the wires 88, and the end 94 of flex cable 81 can be adhesively secured at 98 in recess 87.

The wires 88 are the ends of a connecting cable 80 which connects to the system (not shown) with which the assembly is to be used. Intersecting passages 83, 84, 85 and 86 are formed in the upper surface of pieces 52 as seen in FIG. 2, so that cable 80 may be led from the arm 35 to the front passage 83, and from there through one of three alternate routes through passages 84, 85 or 86, to lead the cable towards the carriages on either side or the back of pedestal 50 as required for use on a given disk drive design. In any case, the cable will be held in place by the back end of spring 55 which fits down over piece 52 to form the top for the passages. Preferably, cable 83 has its outer insulative covering and shield cut away at about the place where it passes through passage 83. The inner wires 88, twisted loosely together, continue beneath spring 55 along the top of the body 36 and into recess 87 to the slots in partition 90 as previously described. Peeling off the outer covering and shield before the wires cross the leaf hinge has been found to be desirable so that the stiffness of the cable 80 does not interfere with the flexing of the leaf hinge. By routing the cable and wires as described above, the necessary electrical connections between the head and the carriage are made in a secure manner with the cable and wires being protected from accidental snagging, binding or rubbing by other components, both during assembly and during operation. This routing is clearly preferable to one prior art technique which involved gluing the cable to the side of the arm, pedestal and carriage.

The use of connector board 75, eyelets 82 and flex strip 81 materially facilitates the process of connecting windings 73, 74 to the wires of cable 80 and external circuits. It will be appreciated that the wires used in the winding of coils 73, 74 are extremely fine and delicate. In the prior art which did not include connector board 75 and pins 82, it was necessary to solder these delicate wires directly to pads or terminals on a flex strip, which is a difficult procedure at best and one which is subject to excessive heating of the flex strip as the wires are heated to a high enough temperature to burn off their insulation. These problems are solved in the present invention by first simply winding the delicate wires from coils 73, 74 around the appropriate eyelet 82, which conveniently holds the wires in place. Heat and solder can then be applied to pins 82 to solder both the wires to the eyelets, and the eyelets to the flex strip conductors simultaneously. Since there is no manual holding or positioning of the delicate wires during the soldering operation, the soldering can generally be accomplished with minimum time, and minimum chance of damage to the coil windings or the flex strip which might otherwise result in shorting between flex strip conductors. After the soldering operation, excess length of the delicate wires can be broken off.

As further seen in FIG. 2, opening 60 in body 36 of the arm may be closed by a snap-in insert 120 having a top 121 with a lifting tab 122. The walls of opening 60 are slightly undercut as seen at number 123 of FIG. 8, to accept a plurality of resilient catches 124 integral with top 121, which depend therefrom to engage the undercuts. In addition, one wall of insert 120 is formed as an integral resilient member 125 to engage body 36 near the site where flex strip 81 passes through slot 97. Insert 120 may be manually snapped into place in recess 60 to engage ledges 61, 62 and 63, with its resilient catches 124 engaging the undercut portions 123 of the recess. Resilient member 125 pushes against the back edge of recess opening 60 to stabilize the position of insert 120 in place along the Y axis. Cover 120 can subsequently be permanently secured in place.

Insert 120 is provided with numerous strengthening ribs as shown in FIGS. 7 and 8. One of these ribs, identified by reference number 130, has a central enlargement 131 in which is formed a threaded hole 132 extending obliquely through the insert to receive a set screw 133. As seen more clearly also in FIG. 9, set screw 133 has a rounded or spherical tip 134. Set screw 133 is arranged at an angle to pass through the notch 76 in connector board 175 so as to engage the upper surface of flexure member 65 while at the time providing clearance for the coils. The point of contact between the set screw and the flexure member is at the point of intersection of the X and Y axes of the flexure 65 previously described.

The tip of set screw 133, positioned for nominal engagement with flexure 65, provides a pivot point for the X-Y gimballing action of transducer 32. Any combination of rotational movements about the X and Y axes is permitted by flexure 65 so that the transducer face can conform to the plane of the lower transducer during a data transfer operation. However, no motion of the flexure is permitted in a direction perpendicularly upward from the surface of the disk, but rather forces in that direction are transmitted through the transducer, set screw 133, snap top 120 to the arm as a whole. Similarly, the force applied to transducers 32 and 33 for proper engagement of the floppy disk is transmitted from spring 55, through arm body 36, snap cover 120 and set screw 133 to transducer 32.

The use of snap-in insert 120 provides a number of practical advantages in the manufacture of transducer assemblies. For one thing, an uncluttered top opening is provided in arm 35 prior to insertion of insert 120, which materially facilitates the assembly of the coils, back bar, and terminal board, and the step connecting of the coil wires to the eyelets. Further, since the set screw 133 is in the insert 120, there is no pivot pin within the arm near the transducer coils as in the prior art, thus further facilitating assembly.

Another advantage resides in the fact that different inserts 120 having different sized and shaped lifting tabs 122 can be provided to meet the requirements of different drive manufacturers, permitting the manufacture of a single basic arm structure.

Although the preferred embodiment uses set screw 133 to form the pivot point for the upper transducer gimbal, it is possible instead to use a pin whose position may be adjusted, or to provide an insert molded pin in insert 120. However, for accuracy of adjustment, the set screw or the adjustable pin is preferred.

Set screw 133 is adjusted, with insert 120 in place in the arm, so that the tip of set screw 133 which forms the actual pivot point is just even with the bottom surface 41 of arm 35; or in other words, until it just contacts the surface of flexure 65 in its unflexed state. This can best be done by testing for electrical continuity between the set screw and the flexure while adjusting.

Both the adjustable set screw 133 or an adjustable pin have advantages over a pivot point formed from a plastic protrusion within the arm as in the prior art. A plastic pivot point tends to wear, forming a flat spot which is inferior as a pivot for the gimbal compared with a hard, rounded one. Further, there are difficulties in accuracy of positioning of a molded plastic pivot point, and an adjustable pivot such as set screw 133 or an adjustable pin can be set for optimum position. If the pivot point is too high or away from the flexure, the transducer will bounce excessively during loading. If the pivot point is too low the flexure will be distorted.

FIG. 9 shows in greater detail the positional relationship of the upper transducer 32 and the lower transducer 33 in operative position engaging the floppy disk 20. Lower transducer 33 is a part of a lower transducer head assembly having a base in the shape of an octagonal nut configuration, known in the industry as a "button head" configuration. The lower head support comprises an outer support form or housing 150 molded from plastic material, with a beveled or conically shaped upper ring portion 151, surrounding a generally flat circular plateau area 152. As previously mentioned, the lower transducer could be of the type known in the prior art where the transducer is immovably fixed in the housing. However, it is preferred to use a transducer 33 having a Z-axis suspension as disclosed and claimed in the above-identified co-pending application. Transducer 33 is then permitted a limited degree of movement in the Z axis, which is perpendicular to the nominal disk plane. The slider transducers 32 and 33, apart from their particular suspension and support structures, are preferably identical. This provides an economic benefit in terms of simplicity and ease of manufacture, and it provides a functional benefit in that the mutual contact areas on the top and bottom of the floppy disk are of the same size.

In the design of "button head" transducers for single sided floppy disks, it is conventional to provide a transducer that is mounted flush with the housing, but the transducer face is curved and projects into the nominal disk plane to ensure good contact. It is not practical to use a curved transducer face in a double sided system. It is therefore preferable in double sided disk systems to provide flat transducer faces for proper opposed mutual contact with the disk. The plastic body of housing 150 must not be allowed to contact the surface of the floppy disk, because the nature of the plastic is such that it scrapes and wears away the oxide coating, even if the plastic material is initially polished smooth. The prior art double sided head assembly disclosed in U.S. Pat. No. 4,151,573, previously discussed, uses a lower transducer which, in addition to being immovably fixed in the button housing, has a large shoulder area of ceramic material surrounding the flat portion of the face containing the gap, which shoulder area is rounded off and blended into the housing. The large ceramic shoulder area is necessary so that the plastic housing does not contact the floppy disk.

It has been found to be advantageous to use a smaller, generally rectangular lower transducer which projects upwardly from the plateau region 152 of the lower housing, rather than the type of structure discussed above. This reduces cost for the lower transducer since it can be made, except for finishing operation, identical to the upper transducer.

With the lower transducer 33 projecting upwardly from the plateau surface 152 of the lower housing, ramps 160 and 161 have been provided to guide the diskette on insertion and removal, in order to protect the transducer and facilitate diskette entry and removal. The ramps 160 and 161 are integral with, and extend above the plateau surface 152, on either side of the location of transducer 32. If necessary, as in the case of the above-identified copending application on "Z-Axis Flexure Suspension Apparatus", ramps 160 and 161 can be bifurcated or gapped along their extent perpendicular to the plane of FIG. 9 to provide clearance for the lower head suspension.

Figure 12:
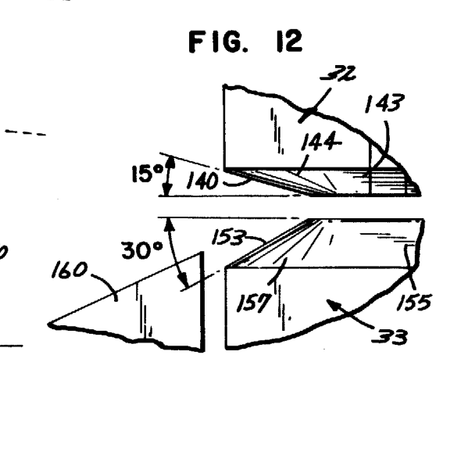
FIG. 12 is a greatly enlarged fragmentary detailed view of a portion of the transducers of FIG. 9, the recording medium being omitted.
Figure 13:
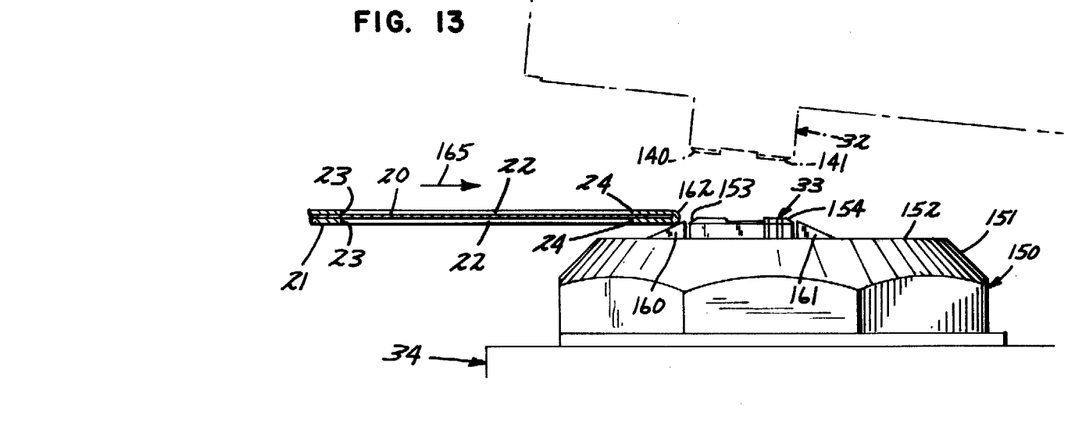
FIG. 13 is a partially schematic view showing the insertion of a diskette into the transducer assembly.

During the process of insertion of a diskette into the head assembly, the upper arm 35 is pivoted upwardly at its leaf hinge as indicated in FIG. 13, by means of a lifting solenoid or other mechanism (not shown) engaging the lifting tab. As the diskette is moved into the head assembly along the direction indicated by arrow 165 in FIG. 13, the leading edge 162 of envelope or jacket 21 engages and rides up ramp 160. As seen also in the detail of FIG. 12, a bevel 153 is provided along the edge of the lower transducer adjacent ramp 160, and this also helps to guide the envelope above and across the transducer surface. The top of ramp 160 is higher than the start of the bevel 153 to ensure that the diskette does not engage the side of the transducer. Once the floppy disk is in place, the arm can be released to load the heads onto the floppy disk through the access windows.

For removal of the floppy disk, arm 35 is once again raised and the jacket will be moved in the opposite direction. At this point, ramp 161, and adjacent beveled edge 154 on the other side of the lower transducer become important to guide the diskette envelope 21. The portion of envelope 21 at the end 24 of the slot engages and rides up ramp 161 and the beveled side 154 of the transducer then across the transducer. The ramp, in association with the beveled edge of the transducer, thus prevent the end of the jacket 162 or the end of the access slot 24 of the jacket, from engaging and applying forces to the side of the transducer during the insertion or removal process.

It has been standard practice to bevel the edges adjacent the faces of planar type transducers. This has been done by applying a bevel of approximately 22 degrees to the plane of the face, to each of the four edges bordering the face. The bevel is often blended by polishing through a slight radius where it joins the face so that there is no sharp discontinuity or edge which would tend to scuff and cause excessive wear to the recording media passing across the head.

The transducers of the preferred embodiment incorporate such a bevel, but in addition, provide important beveling at the corners of the transducers. It has been found that the most significant amount of wear of the disk surface occurs not during steady state movement of the disk across the transducer for access in operative data transfer position, but during the loading and unloading process. It has been discovered that in prior art systems excessive wear on the disk is caused by the corners of the transducer as the upper arm comes down to load its transducer onto the disk. A somewhat similar wear problem occurs during unloading as a result of off center lifting of the arm which causes dragging of one or two corners of the transducer. If the faces of the transducer were perfectly mutually parallel at the moment of contact with the disk during loading, and if the disk were perfectly planar with no wobble or deformations, the corners of the transducers adjacent the faces would not present a problem. However, in practice, there will be a certain amount of non-parallelism, due to the inevitable manufacturing tolerances, and due to the fact that the "free" or neutral position of flexure 65 will not necessarily hold the transducer 32 parallel to the disk. This means in practical terms that the upper transducer at the moment of impact with the disk will not be parallel to either the disk or the face of the lower transducer, most likely due to some combination of rotations about the X and Y axes. This in turn means that it will be a corner of the transducer that engages the disk first, concentrating the landing impact force over a small area and digging into the oxide coating.

In order to minimize these problems, the corners as well as the edges adjacent the transducer faces are beveled in the improved transducer assembly shown in the accompanying drawings. The faces of the upper and lower transducers are shown respectively in FIGS. 10 and 11. Edge beveling is applied to lower transducer 33 as shown at reference numbers 153, 154, 155, and 156 in FIG. 11. The beveling applied to edges 153 and 154 is 30 degrees, to assist in the guiding action of the diskette during insertion and removal, previously described. For convenience, the beveling applied to edges 155 and 156 can be the same. These beveled edges alone would intersect at the corners leaving a sharp edge which, while tapering away from the disk, would still provide a stress concentration point for cutting grooves or digging into the surface of the disk upon landing. These edges are removed by conical beveling sections 157 at each corner, which blend into the edge bevels 153-156. In addition, all the edge and corner bevels are smoothed and blended tangentially to the face of the transducer during a final polishing operation to remove any sharp edges and discontinuity from the face area.

Figure 10:
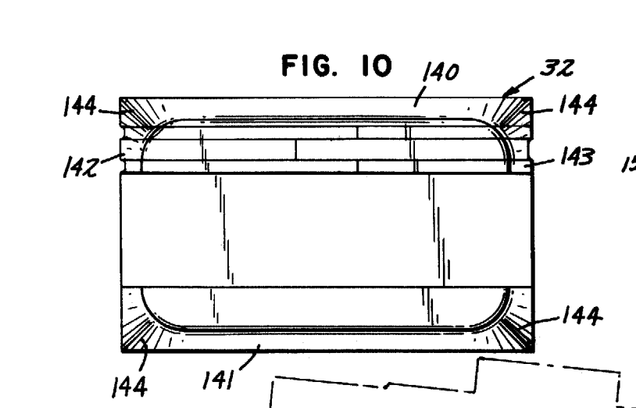
FIG. 10 is an enlarged bottom view of a first transducer, to a larger scale.
Figure 11:
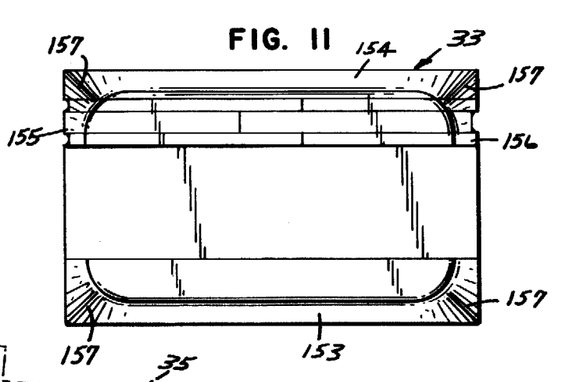
FIG. 11 is an enlarged top view of a second transducer.

Upper transducer 32 is similarly provided with edge bevels 140-143 which are preferably 15 degrees, and corner bevels 144. Again, all bevels are blended together and to the face to remove all sharp edges. The 15 degree bevel is preferred for the upper transducer because it provides a broader corner bevel to even better distribute the impact force. However, the 30 degree bevel is preferred for the lower transducer for cooperation with ramps 160, 161 as previously described.

What is claimed:

1. A transducer supporting assembly for a double sided floppy diskette recording system, comprising:

a transducer support carriage having a first magnetic transducer mounted thereon;

a thin flexible leaf hinge member;

an elongated support arm having a second magnetic transducer mounted thereon and adjacent one end thereof for contact with a recording medium in operative position, said support arm having a generally flat configuration of the surface thereof adjacent the recording medium in operative position, and having a recessed portion in said flat surface adjacent the end of said arm remote from said second transducer;

a first clamping plate configured to be received in said recessed portion of said arm;

a second clamping plate;

means connecting said clamping plates on opposite surfaces of one end of said leaf hinge member, and for connecting the leaf hinge and clamping plates to said arm with said first clamping plate positioned in said recess;

said first and second clamping plates having opposed straight edges cooperatively defining a bending axis or fulcrum for said leaf hinge; and means mounting the other end of the leaf hinge to the carriage to position the support arm so that the first and second transducers are in generally opposed relationship, whereby the support arm can be hinged open to permit insertion of a diskette and closed to bring the first and second transducers into operative contact with opposite sides of the floppy diskette.

2. Apparatus according to claim 1 wherein said first and second clamping plates and said recess are configured so that in assembly the outer surface of said second clamping plate is generally planar with the generally flat surface of said arm.

3. Apparatus according to claim 2 wherein said clamping means are spot welded to said leaf hinge generally along and adjacent said opposed straight edges.

* * * * *